US009161154B2

(12) United States Patent
Ibasco et al.

(10) Patent No.: US 9,161,154 B2
(45) Date of Patent: Oct. 13, 2015

(54) SYSTEM AND METHOD OF TRIGGERING AND EXECUTING ACTIVE CONTENT ON A RECIPIENT DEVICE

(75) Inventors: Alex D. Ibasco, Paranaque (PH); Eduardo Ramon G. Joson, Quezon (PH); William Emmanuel S. Yu, Pasay (PH)

(73) Assignee: EINNOVATIONS HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 13/984,836

(22) PCT Filed: Feb. 3, 2012

(86) PCT No.: PCT/SG2012/000030
§ 371 (c)(1),
(2), (4) Date: Aug. 9, 2013

(87) PCT Pub. No.: WO2012/108838
PCT Pub. Date: Aug. 16, 2012

(65) Prior Publication Data
US 2013/0316698 A1  Nov. 28, 2013

(30) Foreign Application Priority Data

Feb. 10, 2011  (SG) ................ 201100953-7

(51) Int. Cl.
*H04M 3/00* (2006.01)
*H04W 4/00* (2009.01)
*H04M 3/42* (2006.01)
*H04L 12/58* (2006.01)

(52) U.S. Cl.
CPC ............. *H04W 4/001* (2013.01); *H04L 51/18* (2013.01); *H04M 3/42042* (2013.01); *H04M 3/42382* (2013.01); *H04L 51/08* (2013.01); *H04M 2203/1008* (2013.01)

(58) Field of Classification Search
CPC ........... H04W 4/02; H04W 4/12; H04W 4/14; H04L 51/18; H04M 3/42042; H04M 3/42382
See application file for complete search history.

(56) References Cited

U.S. PATENT DOCUMENTS

| 2003/0048884 | A1* | 3/2003 | Mateu ................. 379/88.22 |
| 2009/0005011 | A1* | 1/2009 | Christie et al. ............ 455/412.2 |
| 2010/0004008 | A1* | 1/2010 | Abolrous et al. ............ 455/466 |
| 2010/0240350 | A1* | 9/2010 | Ilkanaev et al. ............... 455/419 |

* cited by examiner

*Primary Examiner* — Khalid Shaheed
(74) *Attorney, Agent, or Firm* — Novak Druce Connolly Bove Quigg LLP

(57) ABSTRACT

A system and method of triggering and executing active content on a recipient device, the system comprising a sender device configured to send a trigger message to the recipient device, wherein the trigger message specifies at least one executable file, the executable file comprising active content to be executed by the recipient device, is disclosed.

10 Claims, 2 Drawing Sheets

SYSTEM AND METHOD OF TRIGGERING AND EXECUTING ACTIVE CONTENT ON A RECIPIENT DEVICE

RELATED APPLICATIONS

This application is a national stage application (under 35 U.S.C. §371) of PCT/SG2012/000030, filed Feb. 3, 2012, which claims benefit of Singapore application 201100953-7, filed Feb. 10, 2011.

FIELD OF THE INVENTION

The present invention relates to a system of triggering and executing active content on a recipient device, and in particular but not exclusively to a system and method of delivering, triggering and executing multimedia content.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

BACKGROUND ART

The following discussion of the background to the invention is intended to facilitate an understanding of the present invention only. It should be appreciated that the discussion is not an acknowledgement or admission that any of the material referred to was published, known or part of the common general knowledge of the person skilled in the art in any jurisdiction as at the priority date of the invention.

Communication may take place between mobile device users without answering an audio call. An example of such subtle communication takes the form of a missed call, where a sender's call is dropped before the recipient can pick up the audio call. Typically, the parties involving in such subtle communication already have a predetermined agreement for one party to ring the other and hang-up after a certain number of rings. To the parties, the missed call would convey a clear message (e.g. indication that one party has arrived at the meeting place). A missed call could also be employed to simply check if the other party is online, much like an Internet 'ping'. The missed call could also be used to call the attention of the other, as when one is inviting the other to initiate a (and thus get charged for the) call.

However, such subtle communication may be misunderstood and is generally ambiguous.

As an alternative to audio calls, a more overt form of communication takes the form of SMS. However, costs are generally incurred and there is a constraint of 160 characters per SMS text message. Multimedia Messaging Service (MMS) extends the core SMS (Short Message Service) capability by allowing non-text content to be added to the message, such as pictures, audio or audio-visual content.

While providing an enhanced user experience over the SMS, both SMS and MMS require the recipient of the SMS/MMS to manipulate his mobile device (usually via pressing some buttons on the mobile device) in order to be able to view/hear the MMS message. Another disadvantage associated with an MMS message is the repeated delivery of payload every time an MMS message is sent.

Further, most mobile networks provide for caller identification (caller ID) on the display of the recipient's mobile device. This requires the recipient to be in close proximity of the mobile device before being able to read the caller. ID. There have been improvements to caller ID system which audibly alerts the call recipient to the nature of the incoming call—i.e. audio caller ID system. Such audio caller ID system generally includes a speech synthesizer configured to identify a name and/or number of the calling party displayed on the recipient's caller ID display.

Other caller identification method works by customization of ring tones depending on the caller. However, the ringtone is triggered by a call and hence is part of the call establishment process. In addition, audio or ringtone are generally mapped to a caller and such mapping could be unique, hence caller identification is achieved. However, such ringtones is generally assigned by the recipient to the caller. There is at present no system for the caller being able to cause a particular ringtone to be activated on the recipient's device.

The present invention seeks to alleviate or reduce the above mentioned drawbacks.

SUMMARY OF THE INVENTION

In accordance with a first aspect of the present invention there is provided a system of triggering and executing active content, the system comprising a sender device and a recipient device, wherein:
  the sender device is configured to send a trigger message to the recipient device, the trigger message specifying at least one executable file to be executed by the recipient device; and
  the recipient device is configured to access and execute the specified executable file.

The system may further comprise a service delivery platform arranged to forward the trigger message from the sender device to the recipient device.

Preferably, the service delivery platform is configured to check if the recipient device supports the trigger message.

If the recipient device is found not to support the trigger message, the service delivery platform converts the trigger message to a message supported by the recipient device and sends the converted message to the recipient device.

Preferably, the converted message includes an invitation for the recipient device to download the necessary support for the trigger message.

The trigger message may further comprise a user readable message. Preferably the trigger message is a XMPP message.

The specified executable file may be stored on the recipient device or alternatively stored at a further location specified by the trigger message. Such further location includes an internet store or database from which the executable file may be downloaded.

Preferably, the executable file is in a compressed file format.

In accordance with a second aspect of the present invention there is provided a method of triggering and executing active content, the method comprising the steps of:
  configuring at a sender device a trigger message, the trigger message specifying at least one executable file to be executed by a recipient device, and
  configuring at the recipient device to access and execute the specified at least one executable file.

In accordance with a third aspect of the present invention there is provided a computer readable medium containing software instructions as described above.

BRIEF DESCRIPTION OF THE DRAWINGS

The present invention will now be described, by way of illustrative example only, with reference to the accompanying drawings, of which.

DESCRIPTION OF EMBODIMENTS OF THE INVENTION

Figure 1:
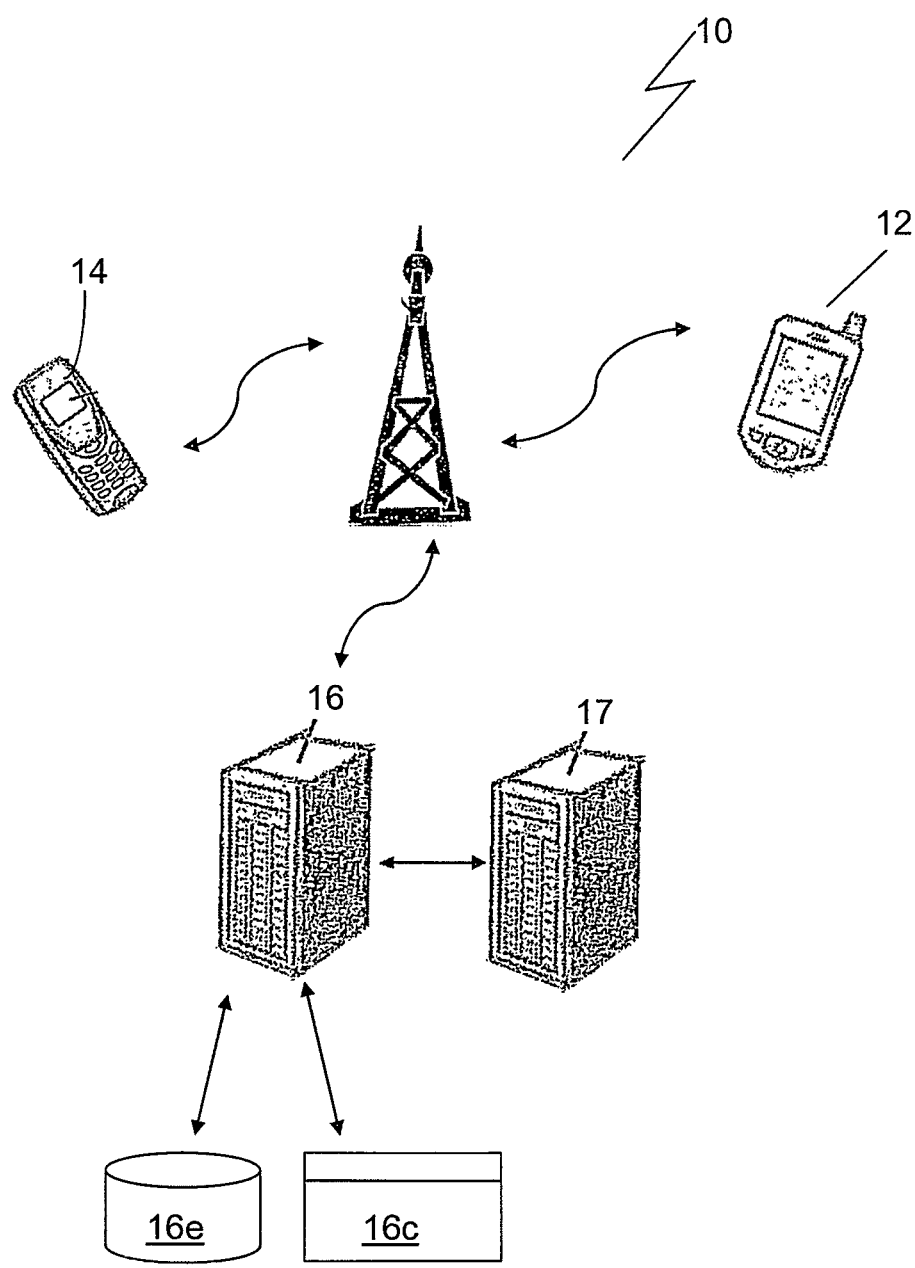
FIG. 1 is a system block diagram in accordance with the embodiment of the invention.

FIG. 1 shows a system 10 for delivering, triggering and executing active content in accordance with an embodiment of the present invention. In the embodiment, the active content is exemplified in the form of multimedia content. System 10 comprises a sender device 12 in communication with a recipient device 14. Sender device 12 and recipient device 14 are typically mobile phones. The sender device 12 is installed with software/firmware components that support a file format particular to the present invention, the file format referred to hereinafter as FX message.

The FX message typically comprises a trigger message (hereinafter known as FX trigger) specifying at least one executable file to be executed by the recipient device 14. The executable file is hereinafter referred to as FX bundle. The FX bundle is in a compressed format. The FX bundle comprises a configuration file and optionally content in the form of one or more of an image file, a video file or/and an audio file; or a pointer to applications such as software widgets. The content as described above is hereinafter referred to as FX content.

The FX bundle's configuration file is preferably in the form of an XML file. The XML file may further contain metadata, information on a download URL for the FX content, display or playback instructions of the FX content including duration and other effects, display or execution instructions for the recipient device 14. For the purpose of executing any FX content associated with olfactory or haptic effects, the recipient device 14 optionally includes peripherals such as vibration source, LED, backlight, additional built-in or adjunct olfactory and haptic I/O whenever available. Examples include a vibration alert, light indicators or/and a scent reservoir.

The FX bundle may be packaged and distributed similar to the way ringtones are distributed.

The recipient device 14 may or may not be installed with, the software/firmware components. In the case where the recipient device 14 is not installed with the software/firmware components, the FX message may have legacy support to allow translation to SMS or MMS, as the case may be, for delivery to such recipient devices 14.

The FX bundle may be made available on the recipient mobile device 14 in a variety of ways. For example:

Pre-deployment—wherein the recipient mobile device 14 is already manufactured with built-in FX bundles.

On-demand—wherein the recipient mobile device 14 can download or request for FX bundles, via for example, the Internet or other means. FX bundles can also be purchased from operator application stores. Alternatively, they may be downloaded as an application in the context of a dynamic menu entry from a corporation.

Contextual—wherein the FX bundle is downloaded when its execution is required and there is no local copy available in the recipient device 14.

Pushed—wherein the FX bundle owner sends out copies of the bundle to subscribers or to a passive market.

The person skilled in the art will appreciate that the above deployment options may be used in combination and future deployment variations may be included in embodiments of the present invention.

The FX bundle typically follows a file naming convention of the form <fx bundle ID>.fx where a .fx file is a compressed file bundle. The filename <fx bundle ID> actually consists of, optionally, the first three digits as the Mobile Country Code (MCC) and the remaining digits as the unique identification code of the FX content. All files within the FX bundle shall also use the filename <fx bundle ID> while retaining their respective file extension such as .png for a PNG image file, .mid for an audio file in MIDI format, and the like.

The sender device 12 and recipient device 14 are further in communication with a Service Delivery platform 16 of the, or each, communication network being utilised.

The Service Delivery platform (SDP) 16 comprises a set of components that provide services delivery architecture (such as service creation, session control & protocols) for FX messaging. In this embodiment, the. Service Delivery platform 16 is configured to provide the appropriate messaging support, i.e. the Extensible Messaging and Presence Protocol (XMPP) for the FX message; implemented via a XMPP server 17. Where the recipient devices 14 are not XMPP compliant, the SDP 16 is also configured to support conventional messaging protocol including SMS and MMS; open standards such as Session Initiation Protocol (SIP) and Session Initiation Protocol for Instant Messaging and Presence Leveraging Extensions (SIMPLE) etc.

The SDP 16 is further configured to inform the recipient of the FX bundle which FX content is requested to be employed based on the FX bundle ID. The FX trigger specifies the action to be performed by the recipient device 14 and causes the recipient device 14 to perform the action that the FX message specifies. There is thus no device reconfiguration involved nor remote access required.

To perform the various functions, the SDP 16 comprises:
- a message relayer 16a to handle and forward messages.
- a transcoder 16b, the transcoder 16b converting an FX message to conventional SMS/MMS messages if the recipient device 14 does not support FX message (i.e. it cannot receive FX triggers and execute FX bundle).
- User Interface 16c with an application store allows purchasing of FXes in interaction with an application store. The interface may be a browser, mobile phone application etc.
- a downloader 16d for FX bundle download The SDP 16 also maintains a registration database 16e for any device 12, 14 installed with the software/firmware components (i.e. FX client). The registration database 16e keeps track of the Mobile Identification Numbers (MIN) of recipient devices 14. Where a recipient device 14's Mobile Identification Number (MIN) is not registered in the SDP 16 as having an FX client, then it is assumed to be a recipient device 14 which is not compatible in supporting FX messaging.

Figure 2:
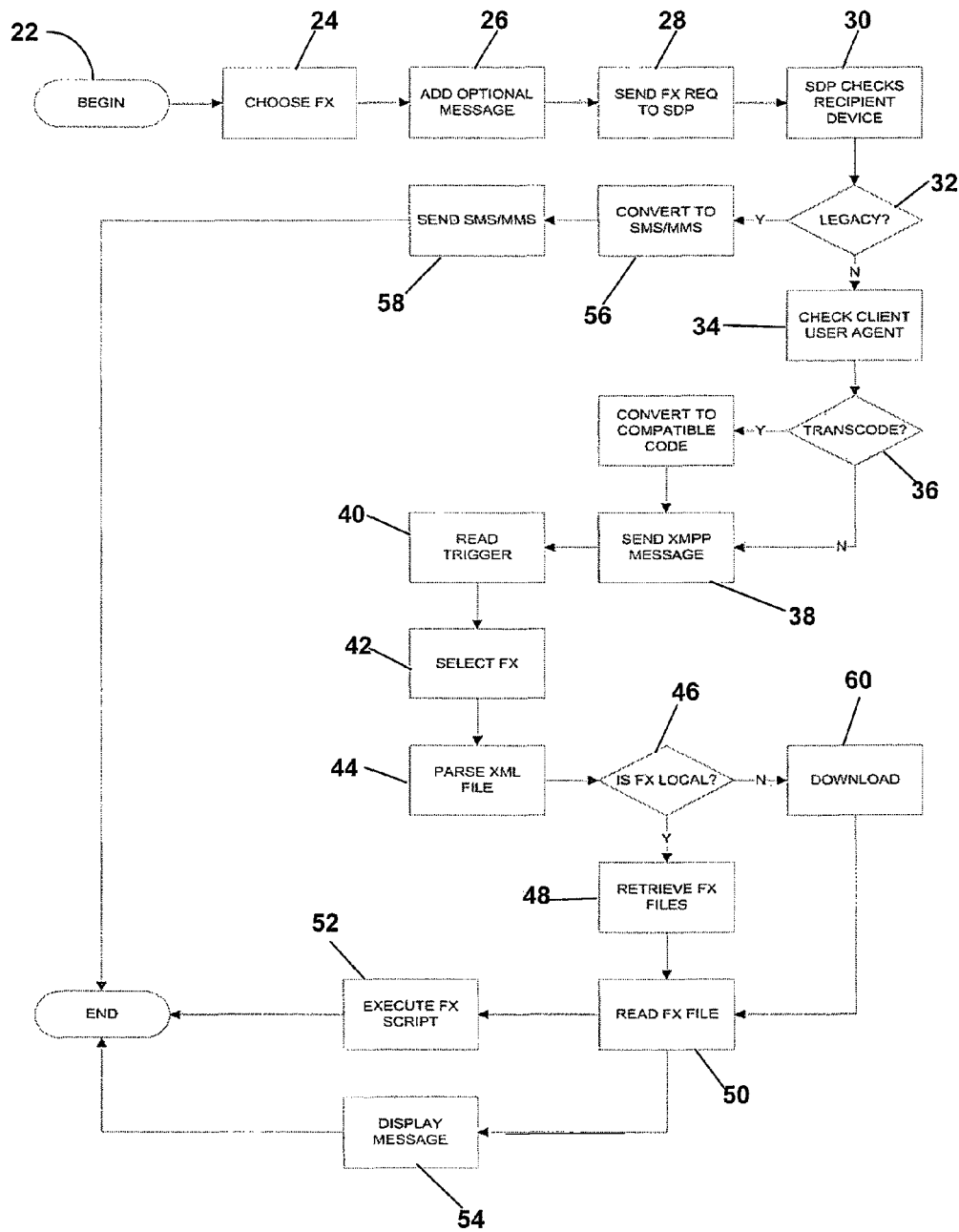
FIG. 2 is a flow diagram of the method of delivering, triggering and executing active content in accordance with the embodiment of the present invention.

The process of creating and receiving an FX message according to the embodiment of the present invention is diagrammatically illustrated in FIG. 2. The FX message comprises the FX trigger and any optional message. The process begins with user of the sender device 12 requesting a FX message (step 22) to be sent to the recipient device 14. For the, sake of illustration, the FX message to be sent is a trigger to execute a birthday FX content (step 24). The optional message is a birthday greeting. The Birthday FX content is in the form of a video of a cake with candles being blown out. The optional customized message is added to the video (step 26). The optional message may be in the form of an SMS or any other customizable text field included as part of the FX message as known to a skilled person. The optional message is short enough to fit into an SMS (under 160 characters) to support fallback use case in case the recipient does not support the FX message.

The FX message request is next sent to the SDP 16 (step 28). Upon receiving the FX message, the SDP 16 checks the recipient's 14 mobile device (step 30) to determine whether the device 14 supports the FX message. This checking may also be done by the recipient device 14. If the recipient mobile device 14 supports FX messaging, i.e. if there is no legacy issue (step 32), the SDP 16 next checks the user agent of the recipient device 14 (step 34) to verify if transcoding is required. If a need for transcoding is required, a compatible code is then generated (step 36). The compatible code is then pushed to the recipient device 14 as an Extensible Messaging and Presence Protocol (XMPP) message (step 38).

The XMPP message is the FX trigger, which is read by the recipient device 14 on receipt (step 40). The specified FX content (i.e. the birthday FX) is then selected (step 42) based on the FX trigger, and the XML file of the XMPP message is parsed (step 44). The SDP 16 next checks if there is a local copy of the required FX bundle (step 46). The checking may be performed on a copy of the FX bundle rather than the message itself. If a local copy of the FX bundle is available, the FX bundle is retrieved, (step 48) and the FX bundle is read (step 50). The retrieval of the FX bundle involves extraction, uncompression, and unbundling. The XML configuration file (FX script) is then executed (step 52) simultaneously with the display of the optional message (step 54).

On the other hand, if it is determined at step 32 that the recipient mobile device 14 does not support or is not compatible with FX messaging (i.e. not compatible with XMPP format), the FX message is converted to a SMS/MMS based message (step 56) in the sense that only the optional customized message text is sent to the recipient mobile device 14 together with the FX ID.

Alternatively, a separate message to inform the user on how to obtain an FX client may also be sent. Instead of a separate message, another alternative is to trigger an application store application to suggest That that FX be purchased by the recipient (if it is not a free FX). This provides a mechanism for application discovery.

The SMS/MMS is then sent to the recipient mobile device 14 (step 58).

In addition, if no transcode is required, the XMPP message is sent directly without the need for conversion to compatible code.

Further, if there is no local FX bundle copy at step 46, the FX bundle may be downloaded (step 60).

The system and method as disclosed provides the following advantages:

The FX messaging protocol is an independent messaging system with its own triggering protocol, which involves not only audio-video playback but also optical and motor responses from the target mobile device, and optionally including haptic and olfactic I/O (in devices so equipped). Hence it is not linked to the recipient mobile device 14.

As the FX message is logically set or configured at the sender device 12, which translates to less processing on the recipient device 14 while providing the flexibility of configuring the outcome. The recipient is thus able to enjoy instantaneous play of the FX content.

Supported FX content under this invention are pre-defined to convey a specific targeted message, with the further option of adding a note for a more personal touch.

As the FX message comprises just the triggering file and an optional message, it does not have to include a payload everytime the message is sent.

Prior art messaging SMS/MMS are limited to multimedia and/or text. SMS is limited to text-based messaging, which has been extended by MMS to include audio and video. However, both MMS and SMS do not support optical and motor components. This invention was developed to extend messaging with optical and motor components, and even to include the haptic and olfactic senses. In addition, the payload under this invention is pre-installed in the client and does not require sending of payload for every instance a message is sent.

Compared with conventional smartphone applications, while various smartphone applications can implement some form of message to trigger a remote action, the remote action does not carry a message with it or does not communicate messages. The invention combines remote control in a mobile context and communications via messaging.

It is to be understood that the above embodiments have been provided only by way of exemplification of this invention, such as those detailed below, and that further modifications and improvements thereto, as would be apparent to persons skilled in the relevant art, are deemed to fall within the broad scope and ambit of the present invention described. Furthermore, although individual embodiments have been discussed it is to be understood that the invention covers combinations of the embodiments that have been discussed as well.

The configuration could be done on the messaging server side which could merely be referenced by the party initiating the FX message.

The FX message can be configured to launch a general application including a web widget (a small application that can be installed and executed within a web page by an end user) instead of just playing back static content. The FX message may further be configured to remotely access a web widget. This adds to further dynamism in the number of possible FX content.

As appreciated by a person skilled in the art, the described naming convention is merely an example of a particular naming mechanism for the file. Depending on the implementation, other naming convention would be possible depending on the applications desired. There are other applications that also use this convention of MCC (Mobile Country Country)+MNC (Mobile Network Code)+ some other code where applicable.

In situations where no transcode is required, the XMPP message may be sent directly without the need to convert to compatible code (i.e. outside of fallback to non-smartphone scenario).

The XMPP server 17 and the service delivery platform 16 may be integrated as known to a person skilled in the art.

The FX message may also be utilised as a trigger to execute content or other applications in a pre-programmable machine.

The invention claimed is:

1. A system of triggering and executing active content on a recipient device, the system comprising a sender device configured to:

send a trigger message to the recipient device, wherein the trigger message specifies at least one executable file, the executable file comprising active content having multimedia content to be executed by the recipient device, wherein the trigger message comprises a user readable message and is a XMPP (Extensible Messaging and Presence Protocol) message, wherein the executable file is stored on the recipient device or alternatively stored at a further location specified by the trigger message;

determine that the recipient device is not configured to support the trigger message; and cause the trigger message to be converted to a message supported by the recipient device, wherein the converted message includes an invitation for the recipient device to download the necessary support for the trigger message.

2. A system according to claim 1, wherein the system comprises a service delivery platform arranged to forward the trigger message from the sender device to the recipient device.

3. A system according to claim 2, wherein the service delivery platform is configured to check if the recipient device supports the trigger message.

4. A system according to claim 1, wherein the further location includes an internet store or database from which the executable file may be downloaded.

5. A system according to claim 1, wherein the executable file is in a compressed file format.

6. A system according to claim 1, wherein the recipient device is configured to access and execute the at least one executable file.

7. A method of triggering and executing active content on a recipient device, the method comprising the steps of:

configuring, by a sender device, a trigger message, wherein the trigger message specifies at least one executable file, the executable file comprising active content having multimedia content to be executed by the recipient device, wherein the trigger message comprises a user readable message and is a XMPP message, wherein the executable file is stored on the recipient device or alternatively stored at a further location specified by the trigger message;

determining that the recipient device is not configured to support the trigger message and causing the trigger message to be converted to a message supported by the recipient device, wherein the converted message includes an invitation for the recipient device to download the necessary support for the trigger message.

8. A method according to claim 7, further comprising the step of checking if the recipient device supports the trigger message.

9. A non-transitory computer readable medium containing software instructions that when executed by a computer cause the computer to:

cause a sender device to configure a trigger message, wherein the trigger message specifies at least one executable file, the executable file comprising active content having multimedia content to be executed by the recipient device, wherein the trigger message comprises a user readable message and is a XMPP message, wherein the executable file is stored on the recipient device or alternatively stored at a further location specified by the trigger message;

determine that the recipient device is not configured to support the trigger message; and cause the trigger message to be converted to a message supported by the recipient device, wherein the converted message includes an invitation for the recipient device to download the necessary support for the trigger message.

10. The non-transitory computer-readable storage medium of claim 9, wherein the instructions when executed further cause a service delivery system to forward the trigger message from the sender device to the recipient device.

* * * * *